United States Patent
Liu et al.

(10) Patent No.: US 12,446,820 B2
(45) Date of Patent: Oct. 21, 2025

(54) METHOD FOR PREDICTING MULTI-TYPE ELECTROCARDIOGRAM HEART RHYTHMS BASED ON GRAPH CONVOLUTION

(71) Applicant: Zhejiang University, Hangzhou (CN)

(72) Inventors: Huafeng Liu, Hangzhou (CN); Jianhui Peng, Hangzhou (CN)

(73) Assignee: ZHEJIANG UNIVERSITY, Hangzhou (CN)

(*) Notice: Subject to any disclaimer, the term of this patent is extended or adjusted under 35 U.S.C. 154(b) by 567 days.

(21) Appl. No.: 18/075,447

(22) Filed: Dec. 6, 2022

(65) Prior Publication Data

US 2023/0225663 A1    Jul. 20, 2023

(30) Foreign Application Priority Data

Jan. 17, 2022    (CN) .......................... 202210083513.8

(51) Int. Cl.
*A61B 5/346*    (2021.01)
*A61B 5/00*    (2006.01)
*G16H 50/30*    (2018.01)

(52) U.S. Cl.
CPC ............ *A61B 5/346* (2021.01); *A61B 5/7267* (2013.01); *G16H 50/30* (2018.01)

(58) Field of Classification Search
CPC ..... A61B 5/346; A61B 5/7235; A61B 5/7267; A61B 5/7275; G16H 50/20; G16H 50/30
See application file for complete search history.

(56) References Cited

U.S. PATENT DOCUMENTS

| | | | |
|---|---|---|---|
| 2018/0032689 A1* | 2/2018 | Kiranyaz | G16H 50/20 |
| 2020/0178825 A1* | 6/2020 | Lu | G06N 3/045 |
| 2023/0293079 A1* | 9/2023 | Chen | G06V 10/25 |

* cited by examiner

*Primary Examiner* — Robin J Mishler
(74) *Attorney, Agent, or Firm* — MATTHIAS SCHOLL P.C.; Matthias Scholl

(57) ABSTRACT

A method for predicting multi-type ECG heart rhythms based on graph convolution includes: acquiring 12-lead ECG signals from a body surface of a patient, and resampling an ECG signal of each lead to a same signal length; constructing a node mutual information pooling U-shaped graph convolution network, and extracting deep features of the ECG signals by using a feature extraction module; performing one-layer one-dimensional convolution on the deep features to obtain a graph feature matrix to be constructed; inputting the obtained undirected graph into a graph encoding module in the graph convolution network, quantitatively calculating node mutual information of the undirected graph by using the graph encoding module, and selecting a node subset with the maximum mutual information to decrease the number of nodes in the undirected graph for down-sampling; inputting the undirected graph with the decreased number of nodes into a graph decoding module.

8 Claims, 3 Drawing Sheets

METHOD FOR PREDICTING MULTI-TYPE ELECTROCARDIOGRAM HEART RHYTHMS BASED ON GRAPH CONVOLUTION

CROSS-REFERENCE TO RELAYED APPLICATIONS

Pursuant to 35 U.S.C. § 119 and the Paris Convention Treaty, this application claims foreign priority to Chinese Patent Application No. 202210083513.8 filed Jan. 17, 2022, the contents of which, including any intervening amendments thereto, are incorporated herein by reference.

BACKGROUND

The disclosure relates to the field of cardiac electrophysiological disease prediction, and more particularly to a method for predicting multi-type electrocardiogram (ECG) heart rhythms based on graph convolution.

As one of the earliest biological signals that are studied and applied in medical clinic, electrocardiograms (ECG signals) reflect the health status of the human heart and are an important basis for clinical diagnosis of cardiovascular diseases. With the rapid increase in the number of ECGs, the demand for computer-assisted ECG analysis becomes more urgent. As an indispensable technical means to realize computer-assisted ECG analysis, automatic ECG classification has an important medical value.

The existing methods for predicting multi-type ECG heart rhythms are mostly classified into two categories. One category is that feature selection is performed based on the morphological features (e.g., the interval between beats, amplitude, and area) of the ECG to improve the diagnostic decision. Such methods are complicated in implementation, and lack the ability of deeper features of ECG signal data. The other category of multi-type heart rhythms prediction is that complex beat segmentation is performed on the ECG and automatic feature extraction and decision is then performed by using a convolutional neural network. In such methods, there is much researchat present, which is mainly carried out by using convolution neural network (CNN) or long short-term memory (LSTM) related model algorithms. However, the process of preprocessing these research data is very complicated. As a result, these methods do not have the characteristic of end-to-end real-time implementation, and are complicated in operation. In addition, there are only two or few types of heart rhythms predicted by conventional methods, so the number of predicted types is not enough, and it is of little practical significance.

SUMMARY

The disclosure provides a method for predicting multi-type ECG heart rhythms based on graph convolution, which converts 12-lead electrical signals into an undirected graph, and learns the hidden features of diseases through a node mutual information pooling U-shaped graph network by using the undirected graph and a relationship among nodes the undirected graph, thereby improving the precision of the prediction result.

A method for predicting multi-type ECG heart rhythms based on graph convolution is provided, the method comprising:

(1) acquiring 12-lead ECG signals from a body surface of a patient, and resampling an ECG signal of each lead to a same signal length;

(2) constructing a node mutual information pooling U-shaped graph convolution network, and extracting deep features of the ECG signals by using a feature extraction module in the graph convolution network;

(3) performing one-layer one-dimensional convolution on the deep features to obtain a graph feature matrix to be constructed, where the rows of the graph feature matrix correspond to various types of arrhythmias to be predicted, and the columns of the graph feature matrix correspond to the feature vectors corresponding to the various types of arrhythmias; and, converting the graph feature matrix into an undirected graph G(V, A, E, W, X), where V is a point set of the undirected graph, and each node in the point set corresponds to each type of arrhythmias; E is an edge set of the undirected graph, which records a similarity between nodes; W is a weight matrix, which gives different weights to different edges; X is a node feature matrix; and, A is a node adjacency matrix;

(4) inputting the obtained undirected graph into a graph encoding module in the graph convolution network, quantitatively calculating node mutual information of the undirected graph by using the graph encoding module, and selecting a node subset with the maximum mutual information to decrease the number of nodes in the undirected graph for down-sampling;

(5) inputting the undirected graph with the decreased number of nodes into a graph decoding module in the graph convolution network, up-sampling, by using the graph decoding module, the undirected graph according to the existing node indexes to restore the original number of nodes so as to generate a new graph feature matrix, and adding the new graph feature matrix with the graph feature matrix before down-sampling and outputting an aggregate graph feature matrix;

(6) performing summation, maximization, minimization and averaging on the aggregate graph feature matrix, splicing a result obtained after four operations into a feature vector and inputting the feature vector into a fully-connected layer, and finally mapping to obtain a probability value of each type of arrhythmias; and (7) training the graph convolution network through a cross entropy loss function by using a large amount of ECG data and the labels of various arrhythmias to predict multi-type ECG heart rhythms.

In a class of this embodiment, the feature extraction module comprises a one-dimensional convolution layer, a residual network ResNet34, and an average pooling layer which are successively connected to one another, and all convolution layers in the residual network ResNet34 are replaced by one-dimensional convolution.

In a class of this embodiment, the graph encoding module selects the node subset with the maximum mutual information by using the following formula:

$$\max_{\Omega \subset V} C(\Omega);$$

$$C(\Omega) = \frac{1}{K}\sum_{v \in \Omega} \log \sigma\left(T_w(x_v, y_{N_v})\right) + \frac{1}{K^2}\sum_{v,u \in \Omega} \log\left(1 - \sigma\left(T_w(x_v, y_{N_u})\right)\right);$$

$$T_w(x_v, y_{N_v}) = S_w(\mathcal{E}_w(x_v), \mathcal{P}_w(y_{N_v}));$$

$$T_w(x_v, y_{N_u}) = S_w(\mathcal{E}_w(x_v), \mathcal{P}_w(y_{N_u}));$$

where $\Omega$ denotes the node subset; K is the number of nodes in the node subset $\Omega$; V is the point set of the undirected graph; $C(\Omega)$ is a mutual information quantization function between neighboring nodes in the node subset $\Omega$; v is any node in the node subset $\Omega$; $x_v$ denotes the feature vector of the node v; $\sigma(\ )$ is a sigmoid activation function; $\mathcal{N}_v$ denotes all neighboring nodes of the node v; $y_{\mathcal{N}_v}$ is a feature matrix comprising the feature vectors of all neighboring nodes of the node v; $\mathcal{E}_w(\ )$ is a vertex embedding function; $\mathcal{P}_w(\ )$ is a neighborhood embedding function; $\mathcal{S}_w(\ )$ is a vertex-neighborhood affinity function, which has the same function as $\mathcal{E}_w(\ )$ and aggregates the result of $\mathcal{E}_w(x_v)$; $\mathcal{E}(\ )$ and $\mathcal{S}_w(\ )$ are implemented by a multilayer perceptron; and, $\mathcal{P}_w(\ )$ is implemented by R-hop graph convolution.

In a class of this embodiment, after up-sampling or down-sampling the undirected graph, the corresponding graph feature matrix is subjected to one-layer graph convolution to update the features of all nodes in the undirected graph.

In a class of this embodiment, in the process of training the graph convolution network in (7), the parameters in the network are iteratively updated by an Adam algorithm until the cross entropy loss function is converged.

In a class of this embodiment, the cross entropy loss function is expressed as follows:

$$L = \{l_1, \ldots, l_N\}^\top;$$
$$l_n = -w_n[y_n \cdot \log x_n + (1-y_n) \cdot \log(1-x_n)];$$
$$w_n = \frac{1}{\log(\mathrm{Sum}(lable_n))};$$

where L is the cross entropy loss function; $l_n$ is correspondingly the loss function value of the $n^{th}$ type of arrhythmias; N is the number of types of arrhythmias, n is a natural number and $1 \le n \le N$; $w_n$ is correspondingly the weight value of the $n^{th}$ type of arrhythmias; $x_n$ is the predicted probability value of the $n^{th}$ type of arrhythmias correspondingly output by inputting the current ECG signal into the graph convolution network; $y_n$ is the label value (0 or 1) of the $n^{th}$ type of arrhythmias corresponding to the current ECG signal; and, $\mathrm{Sum}(lable_n)$ is the number of training data labels about the $n^{th}$ type of arrhythmias.

In a class of this embodiment, in (4), the node mutual information pooling is the core of the graph encoding module, where the graph pooling part is associated with node selection and new graph structure generation, a mutual information score between a node and a neighboring node is calculated in the graph pooling part, and top K node indexes with the highest score are returned.

In a class of this embodiment, in (5), previously recorded node indexes are required during up-sampling, and a new graph feature matrix $X' = O \in \{0\}^{N \times d}$ is generated; N is a number of arrhythmia disease types, and d is a dimension of feature; the graph feature matrix to be up-sampled is added with a down-sampled graph feature matrix in the same layer to obtain an up-sampled graph feature matrix.

Unlike other machine learning or deep learning methods, in the disclosure, sequential electrical signals are represented as a graph structure, and features are updated in a graph convolution learning manner; and, the graph convolution network (GCN) expands the theory of graph domain signal processing, the relational perceptual representation generated by the GCN greatly enhances the discrimination capability of CNN features, and the interpretability of the model can better help clinicians. Compared with the CNN, in the GCN, the adjacency matrix comprehensively utilizes more information related to diseases and patients, and analyzes the ECG data of patients, so that the allorhythmia and various cardiac arrhythmias (e.g., atrial premature beat, ventricular premature beat, etc.) can be found more effectively, and effective patient monitoring can be realized. In addition, the actually measured ECG signals have various interferences, generally comprising baseline drift, EMG interference and power frequency interference. The base drift has a very low frequency, ranging from 0.05 Hz to a few Hz, and the main component is at about 0.1 Hz; however, the P waves, T waves and ST segments of the ECG signals also have a very low frequency, ranging from 0.5 Hz to 10 Hz, so that the frequency spectra of the both are very close. Consequently, it is inevitable to cause a certain loss to the ECG signals during noise elimination. The existing methods mostly comprise performing band-pass filtering on the original signal to remove related noise; but actually, it has a very important impact on the true value of the signal, resulting in an imprecise model learning to a certain extent. Therefore, in the disclosure, in order to avoid the loss of information, directly based on the original ECG signal data, the sequential electrical signal data is converted into a graph and then calculated through graph convolution, and the correlation between ECG leads is converted into the relationship between predicted types of diseases, thereby improving the precision of the solution and reducing the calculation complexity.

The prediction model of the disclosure is based on the node mutual information pooling graph convolution network, so that the arrhythmias can be predicted precisely according to the ECG original signals from the patients. The correlation between features of diseases is taken into consideration during the establishment of the graph structure, and the features are "blurred" originally by using the labels obtained by the deep learning CNN and then aggregated each other in the graph domain, so that a more precise feature can be obtained through mutual influence and a decision is finally made. The disclosure is of great reference significance to clinical diagnosis and treatment, and the ECG signals from the patients can be directly used for arrhythmia diagnosis, thereby avoiding data distortion caused by methods such as band-pass filtering and denoising to a certain extent and improving the precision of diagnosis.

DETAILED DESCRIPTION

To further illustrate the disclosure, embodiments detailing a method for predicting multi-type electrocardiogram (ECG) heart rhythms based on graph convolution are described below. It should be noted that the following embodiments are intended to describe and not to limit the disclosure.

Figure 1:
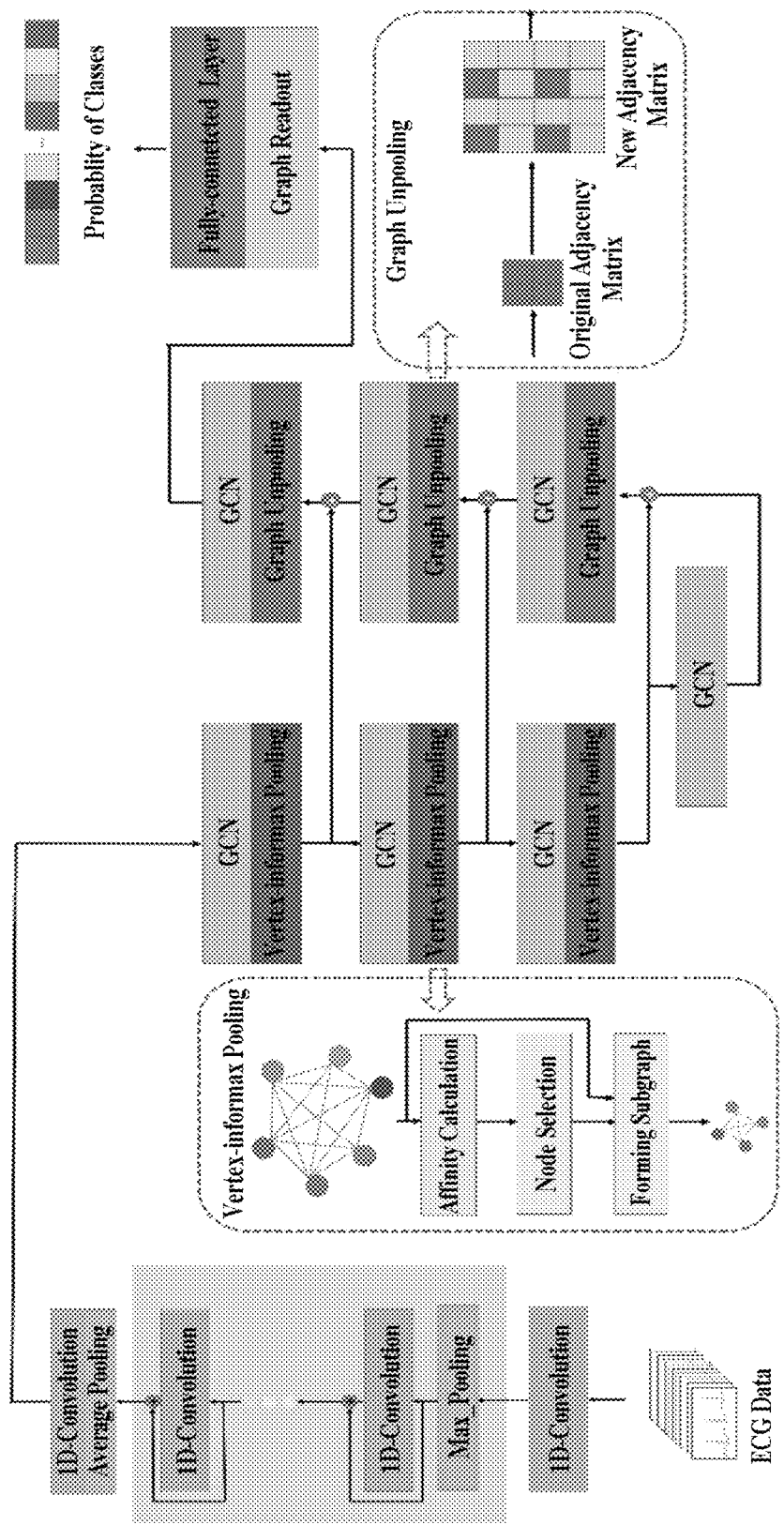
FIG. 1 is a flowchart of a method for predicting multi-type ECG heart rhythms according to one embodiment of the disclosure.

As shown in FIG. 1, the disclosure provides a method for predicting multi-type electrocardiogram (ECG) heart rhythms based on graph convolution, comprising the following steps.

(1) 12-lead electrical signals of the body surface of the patient are acquired, and the electrical signal of each lead is resampled to a same signal length. The resampled data is 12 pieces of one-dimensional data having the same length, and can be directly input into the model.

(2) Since there are labels corresponding to multiple diseases in the training data, the number of patients corresponding to different diseases will be unbalanced. Hence, the number of each type of heart rhythms in the training data is calculated, and each weight of the cross entropy loss function to be finally optimized is modified, to improve the prediction degree of a small number of disease types by the method of the disclosure.

$$\ell(x, y) = L = \{l_1, \ldots, l_N\}^T, l_n = -w_n[y_n \cdot \log x_n + (1 - y_n) \cdot \log(1 - x_n)];$$

$$w_n = \frac{1}{\log(\text{Sum}(lable_n))};$$

where $w_n$ is the weight value corresponding to each label of heart rhythms, $x_n$ is the label probability value predicted by the network, and $y_n$ is the label value and has a value of $\{0,1\}$.

Figure 2:
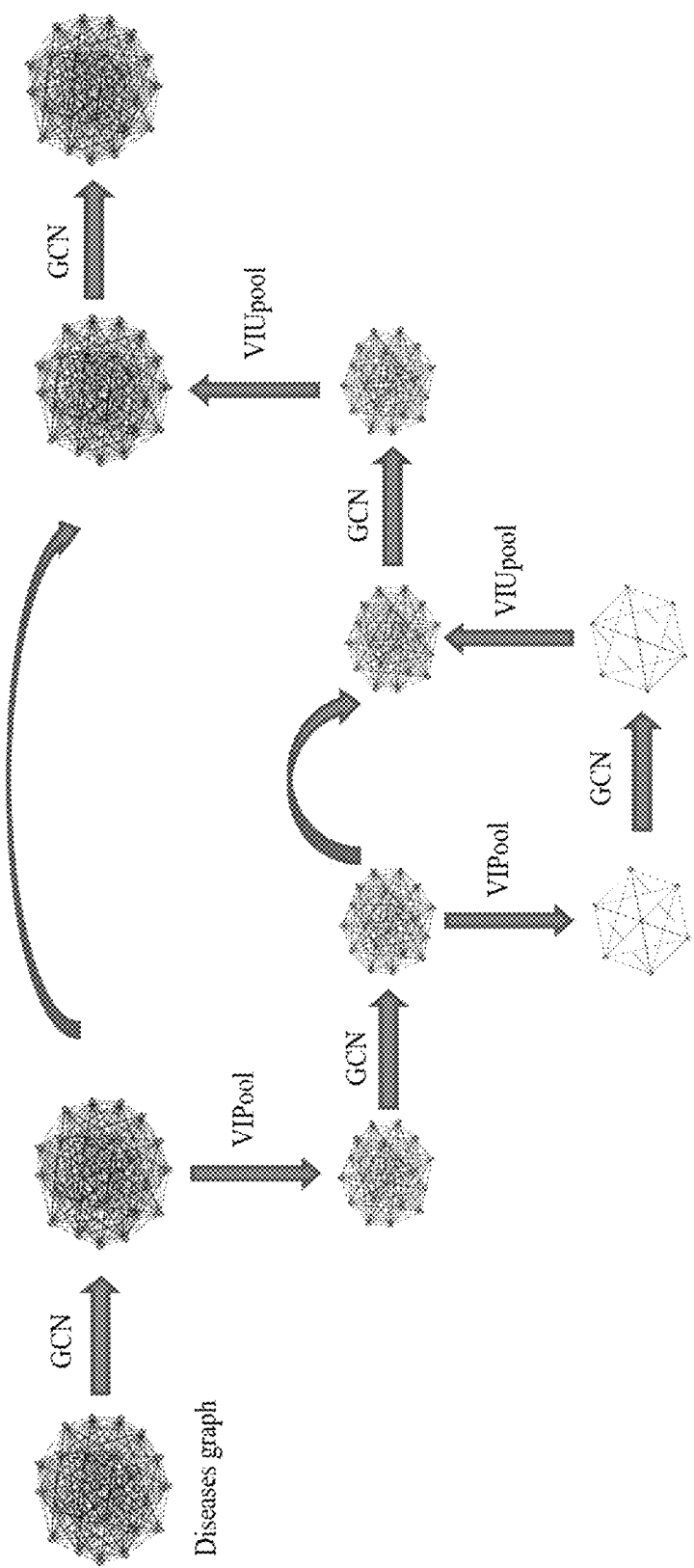
FIG. 2 is a schematic diagram of a node mutual information pooling U-shaped graph convolution network.

(3) The data is conveyed to the feature extraction module in the constructed graph convolution network to obtain deep features extracted by this module. The structure of the graph convolution network is shown in FIG. 2. The feature extraction module comprises a one-dimensional convolution layer, a Residual skeleton based on ResNet34 and an average pooling layer, wherein all convolution layers in the ResNet34 are replaced by one-dimensional convolution.

(4) One-layer one-dimension convolution is performed on the deep features to obtain a graph feature matrix H to be constructed. The number of rows of the graph feature matrix approximately represents the total number of diseases to be predicted, and the columns represent the feature vectors corresponding to the nodes. Here, the node vector is approximately used as the "blurred feature" of each type of diseases.

The graph feature matrix is converted into an undirected graph G (V, A, E, W, X), where V is the vertex set V= $\{v_1, \ldots, v_N\}$ of the undirected graph G, i.e., the set of all nodes; E is the set of edges of the undirected graph G, which records a similarity between nodes; W is the weight matrix, which gives different weights to different edges; X=$[x_1 \ldots x_N]^T \in \mathbb{R}^{N \times d}$ is the node feature matrix.

(5) The obtained undirected graph is input into the graph encoding module in the node mutual information pooling U-shaped graph convolution network. During the mutual information node pooling in this module, a score for node mutual information is calculated for the graph data, and node selection is performed by searching the node subset with the maximum mutual information.

$$\max_{\Omega \subset V} C(\Omega), \text{ subject to } |\Omega| = K;$$

where $C(\Omega)$ denotes the mutual information quantization function between a node and neighboring nodes, K denotes the number of nodes in the selected subset, and $\Omega$ is the set of subset nodes. Generally, the mutual information value between a node and a neighboring node is defined as the KL divergence value between the joint probability distribution and the edge probability distribution, that is:

$$I^{(\Omega)}(v,n) = D_{KL}(P_{v,n} \| P_v \otimes P_n);$$

where $P_{v,n}$ denotes the joint probability distribution between the node v and the set of surrounding nodes, and $P_v \otimes P_n$ is the edge probability between the node v and the set of surrounding nodes.

In accordance with the relationship between the KL divergence and the $f$ divergence, the mutual information value between the node feature and the field feature may be expressed as:

$$C(\Omega) = \frac{1}{|\Omega|} \sum_{v \in \Omega} \log \sigma(T_w(x_v, y_{\mathcal{N}_v})) + \frac{1}{|\Omega|^2} \sum_{(v,u) \in \Omega} \log(1 - \sigma(T_w(x_v, y_{\mathcal{N}_u})));$$

where $\sigma(\ )$ is a sigmoid activation function; $\mathcal{N}_v$ denotes all neighboring nodes of the node v; $y_{\mathcal{N}_v}$ is a feature matrix comprising the feature vectors of all neighboring nodes of the node v; u is a certain neighboring node of the node v; and, the function $T_w(\bullet,\bullet)$ denotes a neural network which is constructed by three trainable functions: a vertex embedding function $\mathcal{E}_w(\bullet)$, a neighborhood embedding function $P_w(\bullet)$ and a vertex-neighborhood affinity function $\mathcal{S}_w(\bullet,\bullet)$, specifically:

$$T_w(x_v, y_{\mathcal{N}_u}) = \mathcal{S}_w(\mathcal{E}_w(x_v), \mathcal{P}_w(y_{\mathcal{N}_u}))$$
$$= \mathcal{S}_w\left(\mathcal{E}_w(x_v), \frac{1}{R}\sum_{r=0}^{R}\sum_{v \in \mathcal{N}_w}\left(\left(\tilde{D}^{-1/2}\tilde{A}\tilde{D}^{-1/2}\right)^r\right)_{v,u} W^{(r)}\mathcal{E}_w(x_v)\right);$$

where $\mathcal{E}_w(\bullet)$ and $\mathcal{S}_w(\bullet,\bullet)$ are replaced by two MLPs, respectively, and $\mathcal{P}_w(\bullet)$ is replaced by R-hop graph convolution.

(6) The graph with the decreased number of nodes is input into the graph decoding module. The previously recorded node indexes need to be used during up-sampling, and a new graph feature matrix $X'=O \in \{0\}^{N \times d}$ is generated. Then, the graph feature matrix to be up-sampled is added with the down-sampled graph feature matrix in the same layer to obtain the up-sampled graph feature matrix.

(7) Between the down-sampling and up-sampling of the graph, the feature matrix of the graph is subjected to one-layer graph convolution to update the features of all nodes on the graph. The graph convolution calculation is expressed as:

$$h_i^{(l+1)} = \sigma\left(b^{(l)} + \sum_{j \in \mathcal{N}(i)} \frac{e_{ji}}{c_{ji}} h_j^{(l)} W^{(l)}\right);$$

$$c_{ji} = \sqrt{|\mathcal{N}(j)|}\sqrt{|\mathcal{N}(i)|};$$

where the superscript l denotes the layer number; b denotes the bias value; i and j denote two nodes; $\mathcal{N}(i)$ denotes the neighboring node of the node i; $c_{ji}$ denotes the product of square roots of the degree of the nodes i and j; $W^{(l)}$ denotes the learnable parameter of the $l^{th}$ layer; and, $h_j^{(l)}$ denotes the feature vector of the node j.

(8) Graph features of the obtained graph feature matrix are read, that is, summation, maximization, minimization and averaging are performed on all nodes on the graph to obtain output features of the graph.

(9) After the output features of the graph are obtained, the features are input into a fully-connected layer and finally mapped into a probability value of each type of diseases to be output.

$\hat{y}_1, \hat{y}_2, \ldots, \hat{y}_n = \text{Sigmoid}(0_1, 0_2, \ldots, 0_n);$ where $0_1, 0_2, \ldots, 0_n$ are the output values of the fully-connected layer, and $\hat{y}_1, \hat{y}_2, \ldots, \hat{y}_n$ are the label probability values between 0 and 1 predicted after passing through the activation function.

(10) The forward calculation of the whole model is denoted by a function $f_A = F(x, \theta^{(i)})$, and the parameters of the whole model are updated during the model training by using an Adam algorithm.

$$m_t = \beta_1 m_{t-1} + (1-\beta_1) g_t;$$

$$v_t = \beta_2 v_{t-1} + (1-\beta_2) g_t^2$$

$$\hat{m}_t = \frac{m_t}{1-\beta_1^t};$$

$$\hat{v}_t = \frac{v_t}{1-\beta_2^t}$$

$$\theta_{t+1} = \theta_t - \frac{\eta}{\sqrt{\hat{v}_t} + \epsilon} \hat{m}_t;$$

where $m_t$ and $v_t$ are the estimated values of the first moment (mean) and the second moment (biased variance) of the gradient, respectively, and are both initialized as 0 vector; $g_t$ is the gradient of the forward calculation function $f_A$ at a certain moment; $\hat{m}_t$ and $\hat{v}_t$ are the corrected gradients of the estimated values of the gradient, respectively; $\beta_1$ has a default value of 0.9; and, if $\beta_2$ is 0.999, $\epsilon$ is $10^{-8}$.

Figure 3:
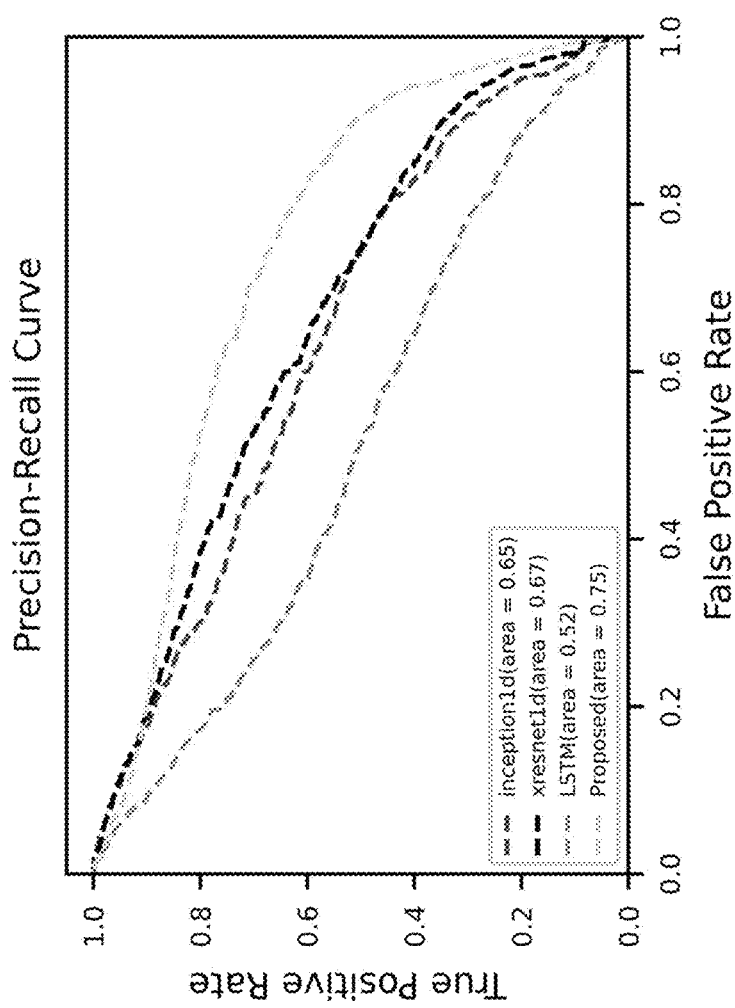
FIG. 3 shows the results of comparison of the experimental result indexes of the disclosure and other existing algorithms.

To verify the effectiveness of the method of the disclosure, the ECG data of 43100 patients are trained and tested. 70% of the data are randomly classified into a training set, while 30% of the data are classified into a test set. Also, several main arrhythmia classification models are selected for comparison. FIG. 3 shows the precision-recall curves of the results of the model of the disclosure and other classification models. It can be seen that the method of the disclosure shows better prediction results than other models using only 1D-resnet34 and is effective for the node mutual information down-sampling graph convolution of diseases. It can be seen that the model of the disclosure can more deeply learn the hidden features of ECG data on the basis of the features of the convolutional neural network, so that the representation capability of the model for multi-label correlation prediction can be greatly improved, the correlation between diseases can be determined more effectively, and the auxiliary diagnosis can be precisely made.

It will be obvious to those skilled in the art that changes and modifications may be made, and therefore, the aim in the appended claims is to cover all such changes and modifications.

What is claimed is:

1. A method for predicting multi-type electrocardiogram (ECG) heart rhythms, the method comprising:
   (1) acquiring 12-lead ECG signals from a body surface of a patient, and resampling an ECG signal of each lead to a same signal length;
   (2) constructing a node mutual information pooling U-shaped graph convolution network, and extracting deep features of the ECG signals by using a feature extraction module in the graph convolution network;
   (3) performing one-layer one-dimensional convolution on the deep features to obtain a graph feature matrix to be constructed, where rows of the graph feature matrix correspond to various types of arrhythmias to be predicted, and columns of the graph feature matrix correspond to feature vectors corresponding to the various types of arrhythmias; and, converting the graph feature matrix into an undirected graph $G(V, A, E, W, X)$, where V is a point set of the undirected graph, and each node in the point set corresponds to each type of arrhythmias; E is an edge set of the undirected graph, which records a similarity between nodes; W is a weight matrix, which gives different weights to different edges; X is a node feature matrix; and, A is a node adjacency matrix;
   (4) inputting the obtained undirected graph into a graph encoding module in the graph convolution network, quantitatively calculating node mutual information of the undirected graph by using the graph encoding module, and selecting a node subset with maximum mutual information to decrease a number of nodes in the undirected graph for down-sampling;
   (5) inputting the undirected graph with decreased number of nodes into a graph decoding module in the graph convolution network, up-sampling, by using the graph decoding module, the undirected graph according to existing node indexes to restore an original number of nodes so as to generate a new graph feature matrix, and adding the new graph feature matrix with the graph feature matrix before down-sampling and outputting an aggregate graph feature matrix;
   (6) performing summation, maximization, minimization and averaging on the aggregate graph feature matrix, splicing a result obtained after four operations into a feature vector and inputting the feature vector into a fully-connected layer, and finally mapping to obtain a probability value of each type of arrhythmias; and
   (7) training the graph convolution network through a cross entropy loss function by using a large amount of ECG data and labels of various arrhythmias to predict multi-type ECG heart rhythms.

2. The method of claim 1, wherein the feature extraction module comprises a one-dimensional convolution layer, a residual network ResNet34, and an average pooling layer which are successively connected to one another, and all convolution layers in the residual network ResNet34 are replaced by one-dimensional convolution.

3. The method of claim 1, wherein the graph encoding module selects the node subset with the maximum mutual information by using the following formula:

$$\max_{\Omega \subset V} C(\Omega);$$

$$C(\Omega) = \frac{1}{K} \sum_{v \in \Omega} \log \sigma\left(T_w(x_v, y_{\mathcal{N}_v})\right) + \frac{1}{K^2} \sum_{v, u \in \Omega} \log\left(1 - \sigma\left(T_w(x_v, y_{\mathcal{N}_u})\right)\right);$$

$$T_w(x_v, y_{\mathcal{N}_v}) = \mathcal{S}_w\left(\mathcal{E}_w(x_v), \mathcal{P}_w(y_{\mathcal{N}_v})\right);$$

$$T_w(x_v, y_{\mathcal{N}_u}) = \mathcal{S}_w\left(\mathcal{E}_w(x_v), \mathcal{P}_w(y_{\mathcal{N}_u})\right);$$

where $\Omega$ denotes the node subset; K is the number of nodes in the node subset $\Omega$; V is the point set of the undirected graph; $C(\Omega)$ is a mutual information quantization function between neighboring nodes in the node subset $\Omega$; v is any node in the node subset $\Omega$; $x_v$ denotes the feature vector of the node v; $\sigma(\ )$ is a sigmoid activation function; $\mathcal{N}_v$ denotes all neighboring nodes of the node v; $y_{\mathcal{N}_v}$ is a feature matrix comprising the feature vectors of all neighboring nodes of the node v; $\mathcal{E}_w(\ )$ is a vertex embedding function; $\mathcal{P}_w(\ )$ is a neighborhood embedding function; $\mathcal{S}_w(\ )$ is a vertex-neighborhood affinity function, which has the same function as $\mathcal{E}_w(\ )$ and aggregates the result of $\mathcal{E}_w(x_v)$; $\mathcal{E}_w(\ )$ and $\mathcal{S}_w(\ )$ are implemented by a multi-layer perceptron; and, $\mathcal{P}_w(\ )$ is implemented by R-hop graph convolution.

4. The method of claim 1, wherein after up-sampling or down-sampling the undirected graph, the corresponding graph feature matrix is subjected to one-layer graph convolution to update features of all nodes in the undirected graph.

5. The method of claim 1, wherein in the process of training the graph convolution network in (7), parameters in the network are iteratively updated by an Adam algorithm until the cross entropy loss function is converged.

6. The method of claim 1, wherein the cross entropy loss function is expressed as follows:

$$L = \{l_1, \ldots, l_N\}^\top;$$
$$l_n = -w_n[y_n \cdot \log x_n + (1-y_n) \cdot \log(1-x_n)];$$
$$w_n = \frac{1}{\log(\text{Sum}(lable_n))};$$

where L is the cross entropy loss function; $l_n$ is a loss function value of a $n^{th}$ type of arrhythmias; N is a number of arrhythmia disease types, n is a natural number and $1 \leq n \leq N$; $w_n$ is correspondingly a weight value of the $n^{th}$ type of arrhythmias; $x_n$ is a predicted probability value of the $n^{th}$ type of arrhythmias correspondingly output by inputting the current ECG signal into the graph convolution network; $y_n$ is a label value of the $n^{th}$ type of arrhythmias corresponding to the current ECG signal; and, $\text{Sum}(lable_n)$ is a number of training data labels about the $n^{th}$ type of arrhythmias.

7. The method of claim 1, wherein in (4), node mutual information pooling is a core of the graph encoding module; a graph pooling part is associated with node selection and new graph structure generation; a mutual information score between a node and a neighboring node is calculated in the graph pooling part, and top K node indexes with the highest score are returned.

8. The method of claim 1, wherein in (5), previously recorded node indexes are required during up-sampling, and a new graph feature matrix $X'=O \in \{0\}^{N \times d}$ is generated; N is a number of arrhythmia disease types, and d is a dimension of feature; the graph feature matrix to be up-sampled is added with a down-sampled graph feature matrix in the same layer to obtain an up-sampled graph feature matrix.

* * * * *